Nov. 3, 1970 H. A. FERRIER, JR 3,538,339

ECCENTRICITY CANCELLING OPTICAL TACHOMETER

Filed Aug. 2, 1967 4 Sheets-Sheet 1

INVENTOR.
HERMAN A. FERRIER, JR

BY Robert G. Clay

ATTORNEY

INVENTOR.
HERMAN A. FERRIER, JR.

BY Robert G. Clay

ATTORNEY

ECCENTRICITY CANCELLING OPTICAL TACHOMETER

Filed Aug. 2, 1967 4 Sheets-Sheet 3

INVENTOR.
HERMAN A. FERRIER, JR.

BY *Robert G. Clay*

ATTORNEY

INVENTOR.
HERMAN A. FERRIER, JR
BY Robert G. Clay
ATTORNEY

United States Patent Office 3,538,339
Patented Nov. 3, 1970

3,538,339
ECCENTRICITY CANCELLING OPTICAL TACHOMETER

Herman A. Ferrier, Jr., San Jose, Calif., assignor to Ampex Corporation, Redwood City, Calif., a corporation of California Filed Aug. 2, 1967, Ser. No. 657,924
Int. Cl. G01d 5/30; H02k 27/20
U.S. Cl. 250—230 3 Claims

ABSTRACT OF THE DISCLOSURE

An optical-disc tachometer is arranged to correct for possible eccentricity in the mounting of the disc. Light is directed through the marked portion of the disc at a first point, and the image of the marks is collected on the opposite side of the disc, reversed with mirrors, and then reflected back through the disc at a second point 180° from the first. A photocell at the second point views the actual marks at that point, and also the superimposed reversed image, which appears to rotate in an opposite direction. The photocell emits a signal varying as the actual marks and the image marks come into and out of phase registration, the signal having twice the frequency that could be obtained from the marks alone, and being accurately related to the rotational speed of the disc even if the disc is somewhat eccentrically mounted.

The invention herein described was made in the course of a contract with the U.S. Navy Department.

BACKGROUND OF THE INVENTION

*Field.*—Tachometers (Class 264) and Electrical Motive Power Systems, particularly with Light or Photosensitive Speed Detectors (Class 318–313).

*Prior art.*—U.S. Pat. 3,231,807 shows a type of transparent tachometer disc having peripheral index marks that are illuminated and sensed by photoelectric means. However, if the disc is mounted with the axis of the marks even slightly eccentric to the axis of rotation, the signal from the photocell may have a once-around cyclicly varying frequency, even when the disc rotates at constant speed.

SUMMARY OF THE INVENTION

The object of the invention is to correct for possible eccentricity in the mounting of a tachometer disc. Accordingly, light is directed through the marked portion of the disc at a first point, and the image of the marks is collected on the opposite side of the disc, reversed with mirrors, and then reflected back through the disc at a second point 180° from the first. A photocell at the second point views the actual marks at that point, and also the superimposed reversed image, which appears to rotate in an opposite direction. The photocell emits a signal varying as the actual marks and the image marks come into and out of phase registration; the signal having twice the frequency that could be obtained from the marks alone, and being accurately related to the rotational speed of the disc even if the disc is somewhat eccentrically mounted.

THE DRAWING

DESCRIPTION OF THE PREFERRED EMBODIMENTS

Figure 1:
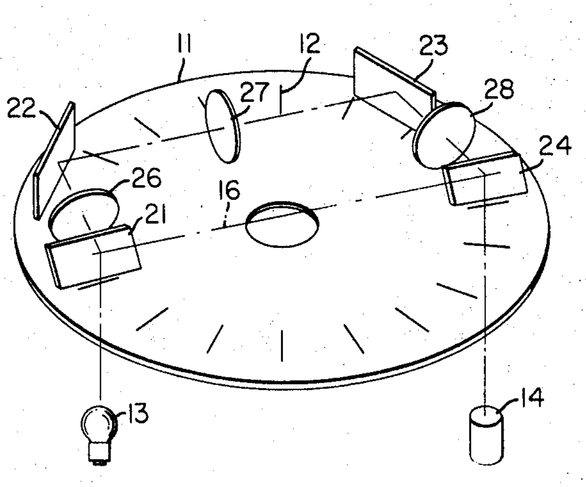
FIG. 1 is a schematic perspective view illustrating the operation of the invention.

Referring now to the drawing and particulraly to FIG. 1 thereof, there is shown a rotating tachometer disc 11 to which the invention is to be applied. The disc 11 is of a type generally known in the art and is made of glass or other transparent material with opaque index marks 12 radially aligned and equi-spaced around a portion of one flat face of the disc near the periphery thereof, the marks 12 and the transparent spaces therebetween defining discontinuities by means of which the rotational speed of the disc can be sensed and measured. Ordinarily in the art, these discontinuities are sensed by placing a light source on one side of the disc and a photoelectric cell on the other side, with the light path passing also through a narrow aperature or grating that is fixed in position as close as possible to the rotating surface of the disc. However, such an arrangement has at least two disadvantages that are difficult and expensive to overcome. First, in order to have the largest possible number of index marks 12 around the disc, the marks are usually applied to the disc by means of a photographic process such that the surface of the disc facing the grating and bearing the marks consists of a soft photographic emulsion, which is easily scratched and damaged by contact with the grating during rotational movement of the disc. Since it is desirable to have the least possible spacing between the disc and the grating, such damaging contact often results during adjustment of the disc and grating while the tachometer is being constructed; and even if such inadvertencies are avoided, any wobble in the disc as it rotates may cause damaging contact. While this problem can be overcome by careful assembly and operation of the apparatus, the manufacturing operation is extremely difficult and expensive. Second, if there is any eccentricity of the center or axis about which the marks are arranged, with respect to the actual rotational axis of the disc, then the speed sensing that is derived includes an artificial once-around error even when the disc is actually rotating at a constant speed; in other words, during each individual rotation of the disc, the sensing varies from an apparent speed that is faster than the actual speed to one that is slower, and back again. If the tachometer is to be used for controlling the speed of the capstan in a magnetic tape transport, then the speed control servo system that relies on the sensing causes the actual speed of the capstan to vary so as to produce an apparent constant speed as sensed by the tachometer. Thus during the recording process, such variation causes the tape to be recorded with "built-in" flutter; and if the tape is then played back on another machine having a different eccentricity error, the speed of the tape and capstan is all the more difficult to control.

In accordance with the present invention, both of these problems are substantially eliminated by dispensing with the grating that is used in the art, and by placing a light source 13 and photocell 14 on the same side of the disc and aligned on the same diameter 16 thereof. The light from the source 13 forms an image of the marks 12 passing in the vicinity thereof and the image is reflected by a set of mirrors 21, 2, 23 and 24 in such a way as to cause a reversal of the image and to return it to the photocell 14 through the disc, so that the photocell views both the actual marks 12 that are passing in the vicinity thereof, and the image of the marks reflected from the opposite end of the diameter 16. Also three lenses 26, 27 and 28 are interposed between the mirrors to focus and maintain the image. Because of the reversal of the image, the image marks appear to the photocell to be rotating in a direction opposite to that of the actual marks that are concurrently seen by the photocell, and the photocell emits a signal that varies in amplitude as the reflected image marks and actual marks come into and go out of phase registration with one another. Thus, the need for a fixed grating close to the disc is completely obviated, and the effects of any eccentricity of the marks with respect to the rotational axis are substantially eliminated, since if the instantaneous speed of the rotating image marks is higher than the actual rotational speed of the disc, then the instantaneous rotational speed of the actual marks viewed by the photocell at the opposite end of diameter 16 is compensatingly slower, and the combined sensing of the two sets of marks by the photocell is precisely and automatically corrected to represent the true instantaneous speed of the disc. An additional advantage to be gained with this arrangement is that the emitted signal has twice the frequency that could be obtained by the standard method previously described, and thus the resolution of the apparatus is increased.

Figure 2:
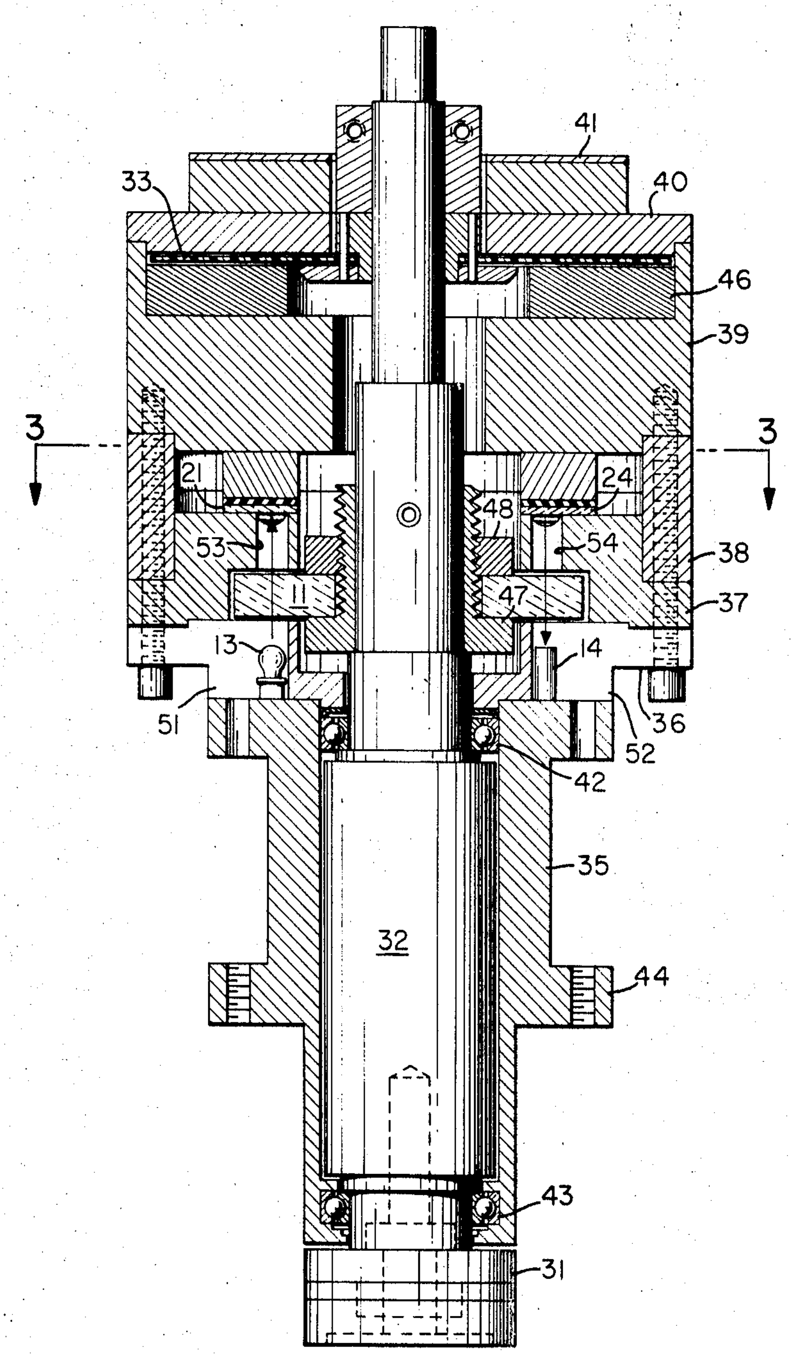
FIG. 2 is a cross-sectional elevation view of an actual embodiment of the invention, taken along the plane of lines 2—2 of FIGS. 3 and 4.
Figure 3:
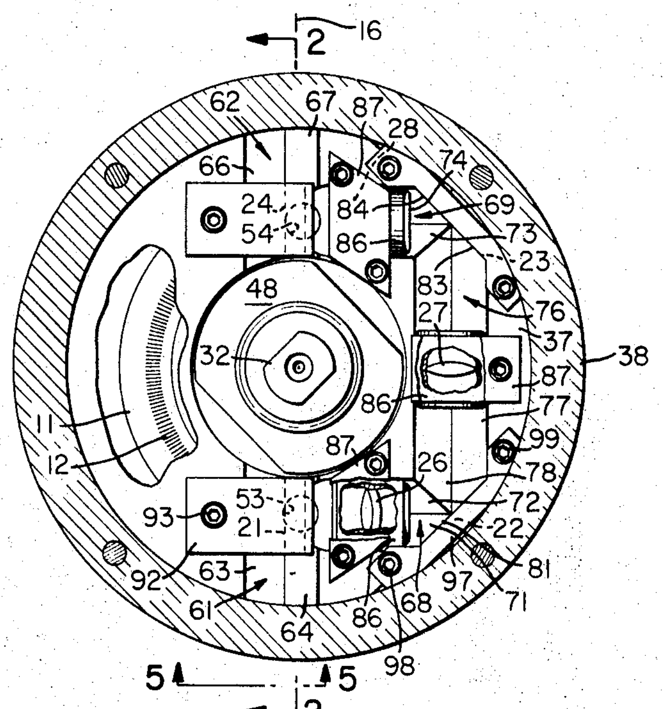
FIG. 3 is a cross-sectional plan view taken along the plane of lines 3—3 of FIG. 2.
Figure 4:
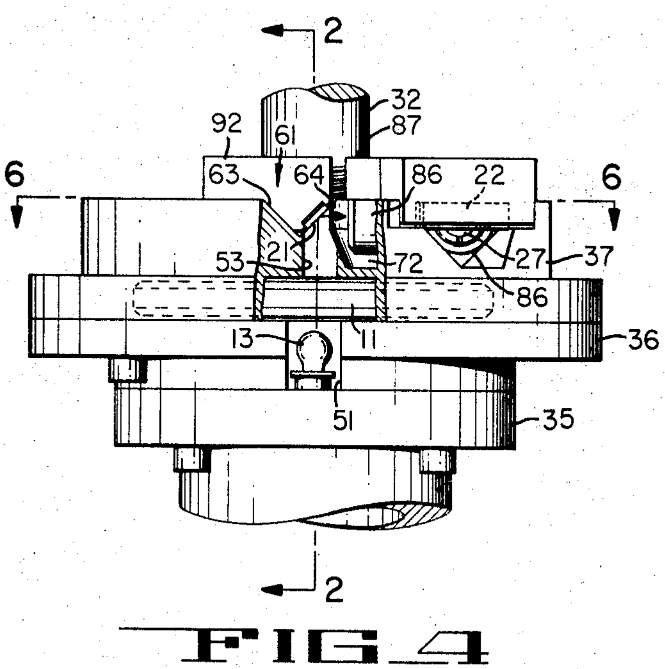
FIG. 4 is a broken-away elevation view of a portion of the apparatus shown in FIG. 3.

Referring now to FIGS. 2 through 4, there is shown an actual construction of the apparatus for use in controlling the speed of a capstan 31. The capstan is mounted on a shaft 32, on which is also mounted the rotor 33 of a printed circuit motor, and a housing consisting of elements 35, 36, 37, 38, 39, 40 and 41 is provided, mounting the shaft 32 as by means of bearings 42 and 43. The housing is fastened to the top plate of a tape transport by means of a flange 44, and element 39 serves to mount a permanent magnet 46 for the printed circuit motor. The disc 11 is mounted on the shaft 32 by means of a keyed collar 47 and threaded nut 48. The light source 13 and photocell 14 may be mounted in slots 51 and 52 of element 36, and element 37 serves to mount the mirrors and lenses, and is formed with channels 53 and 54 for passage of the light through the disc from and to the light source and photocell. The photographically applied marks 12 of the disc are extremely tiny, and in an actual example are about 3000 in number, each occupying a sector that is of approximately the same circumferential dimension as the spaces between the marks.

For the mounting of mirrors 21 and 24, the mounting block 37 is formed with a pair of V-trough grooves 61 and 62 running generally along the diameter 16 and presenting gauge surfaces 63, 64, 66 and 67 inclined at 45° to the disc axis (axis of shaft 32). For the mounting of the lenses 26 and 28, the mounting block 37 is formed with a pair of V-trough grooves 68 and 69 running parallel to the disc and perpendicular to the diameter 16 and presenting gauge surfaces 71, 72, 73 and 74 also inclined to 45° to the disc axis. For the mounting of lens 27, the block 37 is formed with a V-trough groove 76, running parallel to the disc and parallel to the axis 16 and presenting gauge surfaces 77 and 78 inclined at 45° to the disc axis. For the mounting of mirrors 22 and 23, the block 37 is formed with two pairs of co-planar gauge surfaces 81, 82 and 83, 84 parallel to the disc axis at the zones of intersection of the groove 83 and grooves 68 and 69, each pair of surfaces 81, 82 and 83, 84 being inclined at 45° to the diameter 16.

Each of the lenses 26, 27 and 28 is mounted in a barrel mount 86, which is in turn fitted firmly on the respective gauge surfaces and is held in position by means of a clamp 87 that is bolted to the member 37. The lenses 26 and 28 are shown as achromatic objective lenses and lens 27 is shown as a simple field lens.

Figure 5:
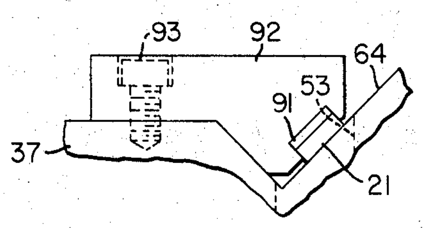
FIG. 5 is an enlarged elevation view of a portion of the apparatus, taken along the plane of lines 5—5 of FIG. 3.

The manner in which the mirror 21 is mounted is more clearly illustrated in FIG. 5, wherein the mirror is shown as mounted on a rubber pad 91 that is in turn mounted on a mounting element 92, which is attached by means of a bolt 93 to the mounting block 37 so as to bring the mirror 21 with its reflecting surface into direct pressurized engagement with the gauge surface 64. The mounting of the mirror 24 is substantially similar.

Figure 6:
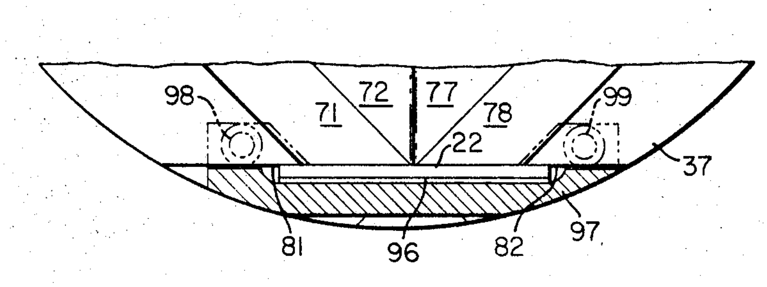
FIG. 6 is an enlarged plan cross-sectional view taken along the plane of lines 6—6 of FIG. 4.

The manner in which the mirror 22 is mounted is more clearly illustrated in FIG. 6, wherein the mirror is shown as mounted on a resilient pad 96, that is in turn mounted on a mounting element 92, which is attached to the member 37 as by means of bolts 98 and 99 so as to bring the reflecting surface of the mirror into direct pressurized engagement with the gauge surfaces 81, 82. The mounting of the mirror 23 is substantially similar.

Figure 7:
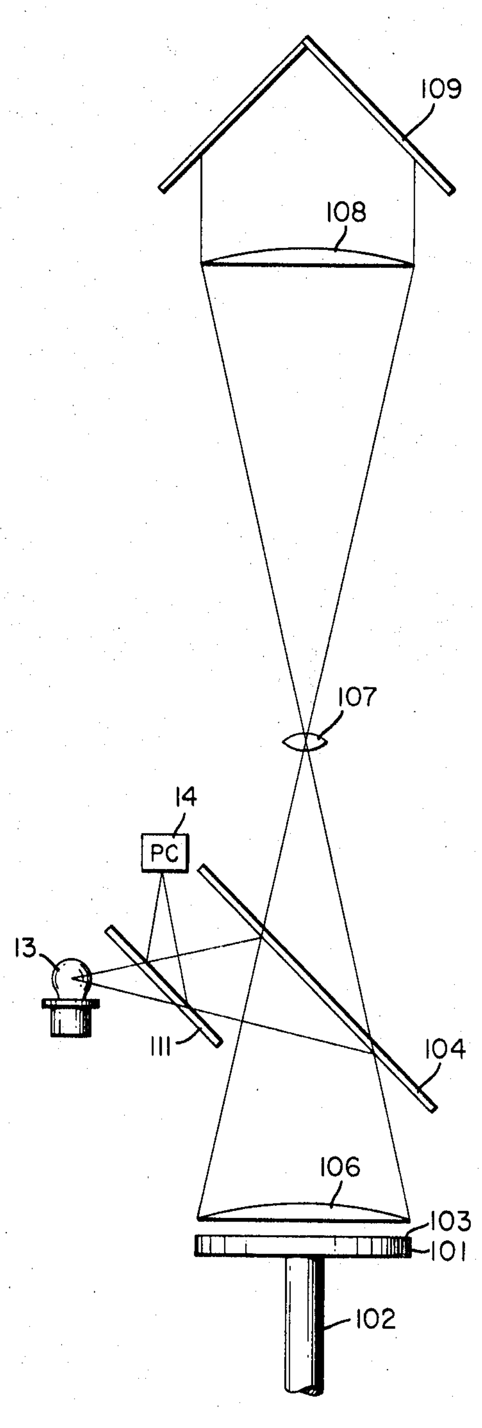
FIG. 7 is a schematic elevation illustrating an alternate embodiment of the invention.

An alternative embodiment of the invention is illustrated in FIG. 7, for utilizing all of the index marks on the entire face of the tachometer disc. In this arrangement, a tachometer disc 101 is mounted for rotation at the end of a shaft 102; and the disc, instead of being transparent, has radially aligned index marks consisting of alternate light-reflecting and light-absorbing sectors on the exposed flat face 103 of the disc. Preferably, all of the sectors are of the same angular width, the light-reflecting sectors being reflecting mirror surfaces, and the light-absorbing sectors being colored a dull black. Light from the light source 13 is reflected by a first beam-splitter means 104 onto the entire fare 103 of the disc and is reflected from the reflecting sectors back along the axis of the disc, through a first field lens 106, an objective lens 107, and a second field lens 108, which are positioned to transmit a focused image from the disc to a 90-degree roof reflecting mirror assembly 109. At the mirror assembly 109, the image is reversed and directed back through the lenses 108, 107 and 106 to the surface 103 of the disc. At the surface of the disc, the reversed image is reflected back again whenever the reflecting sectors of the reversed image fall into phase registration with the actual reflecting sectors of the disc, and the combined images are diverted by the first beam splitter means 104 back in the direction of the light source 13. Before reaching the light source 13, however, these combined images are again diverted by a second beam splitter means 111 away from the light source and toward the photocell 14. It will be clear that the photocell 14 emits a signal that varies as the light reflecting sectors of the disc and the light reflecting sectors of the reversed image of the disc from mirror assembly 109 come into and go out of phase registration with one another. This arrangement has all of the advantages of the arrangement illustrated in FIG. 1 and also has the additional advantage that, if there is an error in the width and spacing of the index marks as ther are printed or otherwise inscribed on various portions of the disc 101, such error does not result in variations of the signal from photocell 14, because the photocell at all times sees all portions of the surface 103 of the disc, as well as all portions of that part of the reversed image that is reflected from the surface 103 of the disc.

Thus there has been described a tachometer arrangement in which light is directed through the marked portion of a rotating transparent disc at a first point, and the image of the marks is collected on the opposite side of the disc, reversed with mirrors, and then reflected back through the disc at a second point 180° from the first. A photocell at the second point views the actual marks at that point, and also the superimposed reversed image, which appears to rotate in an opposite direction. The photocell emits a signal varying as the actual marks and the image marks come into and out of phase registration, the signal having twice the frequency that could be obtained from the marks alone, and being accurately related to the rotational speed of the disc even if the disc is somewhat eccentrically mounted.

What is claimed is:

1. An eccentricity cancelling optical tachometer comprising:

a rotating transparent disc having discontinuities consisting of equi-spaced radially aligned opaque index marks on one flat face of said disc and arranged in a circumferential direction thereon;

a light source for directing light through said disc in an axial direction and through at least a first portion of said discontinuities at a first fixed zone on the rotational path of said index marks to produce an image thereof;

means for producing a reversed image of at least said first portion of said discontinuities rotating in a direction opposite to that of said rotating disc, said last-named means including a plurality of mirrors and lenses arranged to receive said light from the side of said disc opposite said light source and to produce said reversed image in superimposed relation with respect to said marks in a second sector of said disc located at a second fixed zone that is diametrically opposite said first fixed zone;

a first of said mirrors being arranged at said first fixed zone to reflect said image in a direction parallel to said disc face and perpendicular to the diameter between said zones;

a second of said mirrors being arranged to reflect said image from said first mirror in a direction parallel to said disc face and parallel to said diameter in the direction of said second zone;

a third of said mirrors being arranged to reflect said image from said second mirror in a direction parallel to said disc face and perpendicular to said diameter toward said second zone;

a fourth of said mirrors being arranged at said second zone to receive said image from said third mirror and to reflect said image as said reversed image in a direction parallel to the axis of said disc and through said disc to said second fixed zone diametrically opposite said first fixed zone;

a photoelectric transducer arranged at said second fixed zone to view at least a second portion of said discontinuities located 180 degrees from said first portion and said reversed image in superimposed relation and to produce a signal varying as said second portion discontinuities and said reversed image discontinuities come into and out of phase with one another;

a first of said lenses being an achromatic objective lens interposed between said first and second mirrors;

a second of said lenses being a simple field lens interposed between said second and third mirrors; and a third of said lenses being an achromatic objective lens interposed between said third and fourth mirrors.

2. A tachometer as recited in claim 1, wherein:

said disc is provided with a shaft, bearings are provided for said shaft, and a housing mounting said bearings is provided for said tachometer, said housing including a mounting block for said mirrors and lenses;

said mounting block being formed with first and second optical channels parallel to said disc axis at said first and second fixed zones respectively, a pair of first and second V-trough grooves formed along said diameter to intersect said channels and presenting gauge surfaces inclined at 45 degrees to said disc axis, a pair of third and fourth V-trough grooves running parallel to said disc and perpendicular to said diameter through said first and second zones and presenting gauge surfaces inclined at 45 degrees to said disc axis, a fifth V-trough groove running parallel to said diameter and intersecting said third and fourth grooves to present gauge surfaces inclined at 45 degrees to said disc axis, and a pair of co-planar gauge surfaces parallel to said disc axis at the zone of intersection of said fifth groove with each of said second and third grooves and inclined at 45 degrees to said diameter;

means for mounting said first and fourth mirrors in direct gauge contact with one of said gauge surfaces of said first and second grooves, respectively;

means for mounting said second and third mirrors in direct gauge contact with respective pairs of said co-planar gauge surfaces;

barrel means for mounting said first and third lenses and means for mounting said first and third lens barrel means in direct gauge contact with said gauge surfaces of said third and fourth grooves; and barrel means for mounting said second lens and means for mounting said second lens barrel means in direct gauge contact with said gauge surfaces of said fifth groove.

3. A tachometer as recited in claim 2, wherein:

said mirrors each comprise a glass backing plate having a silvered surface on a front side thereof and facing frontwards; and said means for mounting said mirrors includes a mounting element for each mirror, a resilient pad secured to the back of each mirror plate, opposite said silvered surface thereof, said pad being secured to the respective mounting element, and each of said mounting elements being removable secured to said mounting block so as to place portions of the respective silvered surface of each mirror in pressurized engagement with the respective gauge surface of said mounting block.

References Cited

UNITED STATES PATENTS

| | | | |
|---|---|---|---|
| 2,945,132 | 7/1960 | Schuch | 250—230 X |
| 3,244,895 | 4/1966 | Anderegg | 250—231 X |
| 3,326,077 | 6/1967 | Vandermeer | 250—231 X |

JAMES W. LAWRENCE, Primary Examiner

V. LAFRANCHI, Assistant Examiner

U.S. Cl. X.R.

250—233; 318—313; 324—70